US010259397B2

(12) United States Patent
Onuki

(10) Patent No.: US 10,259,397 B2
(45) Date of Patent: Apr. 16, 2019

(54) VEHICLE

(71) Applicant: FUJI JUKOGYO KABUSHIKI KAISHA, Tokyo (JP)

(72) Inventor: Yukio Onuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 20 days.

(21) Appl. No.: 15/432,102

(22) Filed: Feb. 14, 2017

(65) Prior Publication Data

US 2017/0274831 A1 Sep. 28, 2017

(30) Foreign Application Priority Data

Mar. 22, 2016 (JP) .................. 2016-057224

(51) Int. Cl.
 B60R 11/06 (2006.01)
 B60R 11/00 (2006.01)
 B60L 11/18 (2006.01)
 B60K 1/04 (2019.01)
 H01R 13/60 (2006.01)

(52) U.S. Cl.
 CPC .............. *B60R 11/00* (2013.01); *B60K 1/04* (2013.01); *B60L 11/1816* (2013.01); *B60R 2011/0036* (2013.01); *H01R 13/60* (2013.01)

(58) Field of Classification Search
 CPC ..... H01L 2924/00; H02J 7/0044; H02J 7/025; H02J 50/10; H02J 7/0042; H02J 7/0045; Y02T 10/7005; Y02T 90/14; H01M 10/425
 USPC ................................. 296/37.1; 320/107, 108
 See application file for complete search history.

(56) References Cited

U.S. PATENT DOCUMENTS

| 2,832,177 | A  | * | 4/1958  | Mueller ................. A63H 17/00 446/457 |
| 9,216,654 | B2 | * | 12/2015 | Biedrzycki ......... B60L 11/1809 |
| 9,346,365 | B1 | * | 5/2016  | Penilla ..................... B60L 11/18 |
| 9,515,498 | B2 | * | 12/2016 | Nishikawa ............ H02J 7/0088 |
| 9,725,006 | B2 | * | 8/2017  | DeBoer, III ........ B60L 11/1838 |
| 9,834,107 | B2 | * | 12/2017 | Ono ..................... H01R 13/447 |
| 9,981,563 | B2 | * | 5/2018  | Flack ........................ B60L 3/04 |

(Continued)

FOREIGN PATENT DOCUMENTS

JP 2015-117021 6/2015
JP 2016-004771 1/2016

OTHER PUBLICATIONS

Japanese Office Action dated Jul. 11, 2017, in Japanese Patent Application No. 2016-057224 (5 pages—Japanese with English translation).

*Primary Examiner* — Kiran B Patel
(74) *Attorney, Agent, or Firm* — Smith, Gambrell & Russell, LLP

(57) ABSTRACT

A vehicle includes a battery, a charging unit, and a cable groove. The charging unit has a charging cable and a charging gun provided at one end of the charging cable and is configured to supply power to the battery from an external power supply. The cable groove is provided in a vehicle body and capable of accommodating the charging cable. When the charging cable is accommodated in the cable groove, the charging gun is disposed on an outer side of a transmission path, through which a shock load is transmitted to the battery during a collision with an external object.

1 Claim, 4 Drawing Sheets

(56) References Cited

U.S. PATENT DOCUMENTS

| | | | |
|---|---|---|---|
| 2010/0065627 A1* | 3/2010 | Outwater | B60L 11/1816 235/381 |
| 2010/0314182 A1* | 12/2010 | Crain | B60K 1/04 180/60 |
| 2010/0315040 A1* | 12/2010 | Sakurai | B60L 11/1811 320/109 |
| 2011/0139521 A1* | 6/2011 | Ichikawa | B60L 11/123 180/65.1 |
| 2011/0200193 A1* | 8/2011 | Blitz | H04L 9/3271 380/277 |
| 2011/0214926 A1* | 9/2011 | Ichikawa | B60L 5/005 180/2.1 |
| 2011/0287649 A1* | 11/2011 | Kurumizawa | B60L 11/1818 439/304 |
| 2012/0139335 A1* | 6/2012 | Holland | B60L 1/006 307/9.1 |
| 2012/0139486 A1* | 6/2012 | Holland | H02J 7/0054 320/109 |
| 2012/0303397 A1* | 11/2012 | Prosser | H02J 7/0054 705/7.12 |
| 2013/0020984 A1* | 1/2013 | Lucas | B60R 11/06 320/107 |
| 2013/0020990 A1* | 1/2013 | DeBoer | B60L 11/1824 320/109 |
| 2013/0021162 A1* | 1/2013 | DeBoer | B60L 11/1824 340/635 |
| 2013/0069588 A1* | 3/2013 | Oda | B60L 11/1825 320/109 |
| 2013/0110340 A1* | 5/2013 | Park | B60L 11/1816 701/22 |
| 2013/0127413 A1* | 5/2013 | Ohtomo | B60L 3/003 320/109 |
| 2013/0127414 A1* | 5/2013 | Ohtomo | B60L 3/0069 320/109 |
| 2013/0127415 A1* | 5/2013 | Ohtomo | B60L 3/003 320/109 |
| 2013/0169227 A1* | 7/2013 | Tremblay | B60L 11/1818 320/109 |
| 2013/0201641 A1* | 8/2013 | Soden | B60L 3/04 361/752 |
| 2013/0241479 A1* | 9/2013 | Wright, Jr. | H02H 5/10 320/109 |
| 2013/0307325 A1* | 11/2013 | Arasu | B60L 11/123 307/9.1 |
| 2014/0035512 A1* | 2/2014 | Kamachi | H02J 7/0042 320/103 |
| 2014/0035527 A1* | 2/2014 | Hayashigawa | B60L 11/1818 320/109 |
| 2014/0067660 A1* | 3/2014 | Cornish | G06Q 20/145 705/39 |
| 2014/0111157 A1* | 4/2014 | Ono | B60L 11/1816 320/109 |
| 2014/0117144 A1* | 5/2014 | Kinomura | B65H 75/425 242/590 |
| 2014/0232182 A1* | 8/2014 | Kinomura | B60L 1/006 307/10.1 |
| 2014/0266042 A1* | 9/2014 | Storm | B60L 3/0046 320/109 |
| 2014/0339039 A1* | 11/2014 | Ono | B65H 75/40 191/12.4 |
| 2014/0354295 A1* | 12/2014 | Magnusson | G01R 31/04 324/538 |
| 2015/0015211 A1* | 1/2015 | Choi | B60L 11/1861 320/137 |
| 2015/0035478 A1* | 2/2015 | Uchiyama | B60L 1/003 320/107 |
| 2015/0035483 A1* | 2/2015 | Mueller | B60L 11/1818 320/108 |
| 2015/0061594 A1* | 3/2015 | Hockenstrom | B60L 8/006 320/109 |
| 2016/0059724 A1* | 3/2016 | Choi | B60L 11/1848 320/109 |
| 2016/0059731 A1* | 3/2016 | Jung | B60L 11/1818 320/109 |
| 2016/0075244 A1* | 3/2016 | Im | B60L 11/1816 320/107 |
| 2016/0082852 A1* | 3/2016 | Kim | B60L 11/1818 307/125 |
| 2016/0082853 A1* | 3/2016 | Kim | G01R 33/02 439/620.21 |
| 2016/0121745 A1* | 5/2016 | Toepler | B60L 11/1818 320/105 |
| 2016/0159235 A1* | 6/2016 | Yang | B60L 3/00 320/109 |
| 2016/0207408 A1* | 7/2016 | Bianco | B60L 11/1816 |
| 2016/0241060 A1* | 8/2016 | Suzuki | H02J 7/0036 |
| 2016/0257211 A1* | 9/2016 | Kimura | B60L 11/1818 |
| 2016/0264012 A1* | 9/2016 | Im | B60L 11/1848 |
| 2017/0210235 A1* | 7/2017 | Lopez | B60Q 1/2661 |
| 2017/0237944 A1* | 8/2017 | Haas | B60L 11/1816 348/143 |
| 2017/0253137 A1* | 9/2017 | Stauber | B60L 11/1816 |
| 2017/0274831 A1* | 9/2017 | Onuki | B60L 11/1816 |
| 2017/0297446 A1* | 10/2017 | Namba | H04B 3/56 |
| 2017/0349057 A1* | 12/2017 | Namba | B60L 11/18 |
| 2018/0126857 A1* | 5/2018 | Kelly-Morgan | C08L 33/06 |

* cited by examiner

VEHICLE

CROSS-REFERENCE TO RELATED APPLICATIONS

The present application claims priority from Japanese Patent Application No. 2016-057224 filed on Mar. 22, 2016, the entire contents of which are hereby incorporated by reference.

BACKGROUND

1. Technical Field

The present invention relates to a vehicle on which a charging unit having a charging cable and a charging gun is mounted.

2. Related Art

Conventionally, plug-in hybrid vehicles and electric vehicles, each of which has a motor and a battery mounted thereon and can be driven by the motor, have been widespread. When the battery mounted on each of these vehicles is charged, as disclosed in Japanese Unexamined Patent Application Publication (JP-A) No. 2016-004771 (Patent Document 1), for instance, power is supplied to the battery from an external power supply by using a charging unit in which a charging gun is coupled to a charging cable.

When the above charging unit is mounted on the vehicle, it is considered to bundle and dispose the charging cable, for instance. However, when the charging cable is bundled tightly, wear of a bent portion thereof is facilitated. On the other hand, when being bundled in a manner not to be bent tightly, the charging cable becomes bulky. This leads to such a problem that an accommodating space for luggage and the like is occupied by the charging cable and is thereby reduced. In addition, depending on disposition of the charging gun, when the vehicle collides with an external object, the charging gun that typically has high strength possibly collides with the battery due to a shock and damages the battery.

SUMMARY OF THE INVENTION

In view of the above, it is desirable to provide a vehicle that can improve durability of a charging cable, suppress degradation of quality thereof, and protect a battery from a charging gun while securing an accommodating space widely.

An aspect of the present invention provides a vehicle including a battery, a charging unit, and a cable groove. The charging unit has a charging cable and a charging gun provided at one end of the charging cable and is configured to supply power to the battery from an external power supply. The cable groove is provided in a vehicle body and capable of accommodating the charging cable. When the charging cable is accommodated in the cable groove, the charging gun is disposed on an outer side of a transmission path, through which a shock load is transmitted to the battery during a collision with an external object.

The cable groove may be provided in an accommodating portion of the vehicle body, and the accommodating portion may be provided for accommodating luggage.

The cable groove may be provided in an inner surface on the accommodation portion side of an opening/closing door that is capable of opening and closing the accommodation portion.

The cable groove may extend in an inner wall surface of the accommodation portion and may also extend along an opening of the accommodation portion opened and closed by the opening/closing door that is capable of opening and closing the accommodation portion.

The vehicle may further include: a gun groove that is provided in the opening/closing door and capable of accommodating the charging gun; and a support lid configured to at least partially cover the charging gun accommodated in the gun groove and retain the charging gun with the opening/closing door.

Another aspect of the present invention provides a vehicle including an accommodating portion, a battery, a power receiver, and a charging unit accommodation portion. The accommodating portion is provided in a vehicle body and has an opening. The battery is provided below the accommodating portion. The power receiver is coupled to a charging unit that has a charging cable and a charging gun provided at one end of the charging cable, and is configured to charge the battery with power from an external power supply. The charging unit accommodation portion accommodates the charging unit. The charging unit accommodation portion extends along the opening of the accommodating portion.

Another aspect of the present invention provides a vehicle including an accommodating portion, a battery, a power receiver, and a charging unit accommodation portion. The accommodating portion is provided in a vehicle body and has an opening. The battery is provided below the accommodating portion. The power receiver is coupled to a charging unit that has a charging cable and a charging gun provided at one end of the charging cable, and is configured to charge the battery with power from an external power supply. The charging unit accommodation portion accommodates the charging unit. The charging unit accommodation portion is provided in an inner surface on an accommodating portion side of an opening/closing door that is capable of opening and closing the opening.

DETAILED DESCRIPTION

A detailed description will hereinafter be made on a preferred implementation of the present invention with reference to the accompanying drawings. Dimensions, materials, other specific numerical values, and the like described in such an implementation are merely illustrative to facilitate understanding of the invention and thus do not limit the present invention unless otherwise particularly noted. Note that, in this specification and the drawings, an overlapping description will not be made on elements that have substantially the same function or configuration and the elements will be denoted by the same reference sign. In addition, elements that are not directly related to the present invention will not be illustrated.

Figure 1:
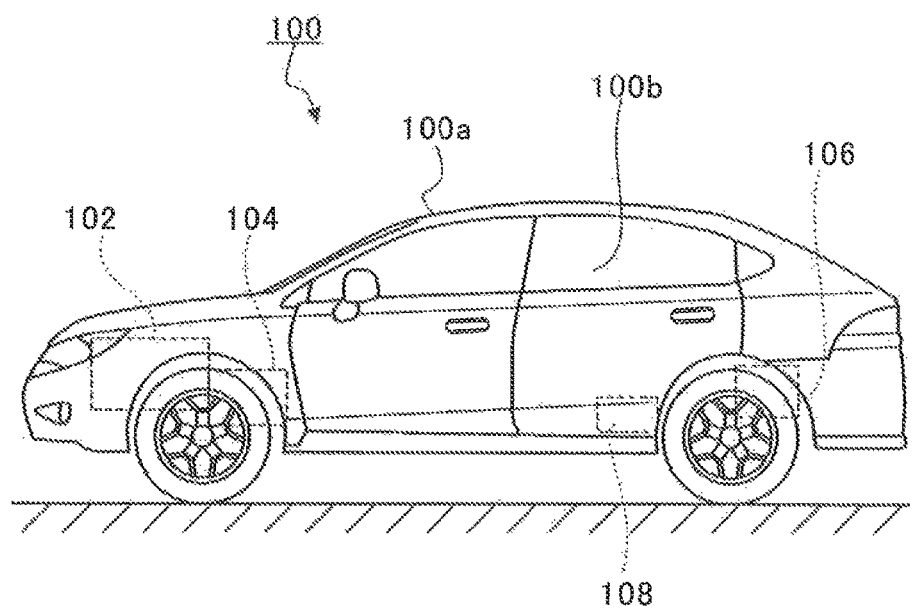
FIG. 1 is a side view of a vehicle.

FIG. 1 is a side view of a vehicle 100. Here, a plug-in hybrid vehicle that has an engine 102 and a motor 104 as drive sources will be raised as an example of the vehicle 100 for the description. As illustrated in FIG. 1, the engine 102, the motor 104, and a battery 106 are mounted on the vehicle 100. The engine 102 is disposed in a front side in a front-rear direction (a right-left direction in FIG. 1) of a vehicle body 100a, and the motor 104 is disposed at the rear of the engine 102. The battery 106 is disposed in a rear side of the vehicle body 100a.

In accordance with a travel state including requested torque, the vehicle 100 travels by preferentially using the engine 102 to the motor 104, travels by preferentially using the motor 104 to the engine 102, or travels by using both of the motor 104 and the engine 102.

A power control unit (PCU) 108 is also mounted on the vehicle 100. The PCU 108 is disposed under a floor of a vehicle cabin 100b, for instance, and is located between the motor 104 and the battery 106 in the front-rear direction of the vehicle body 100a. The PCU 108 includes a booster, an inverter, and the like. The booster boosts DC power from the battery 106. The inverter converts the DC power to AC power and supplies the AC power to the motor 104.

Figure 2:
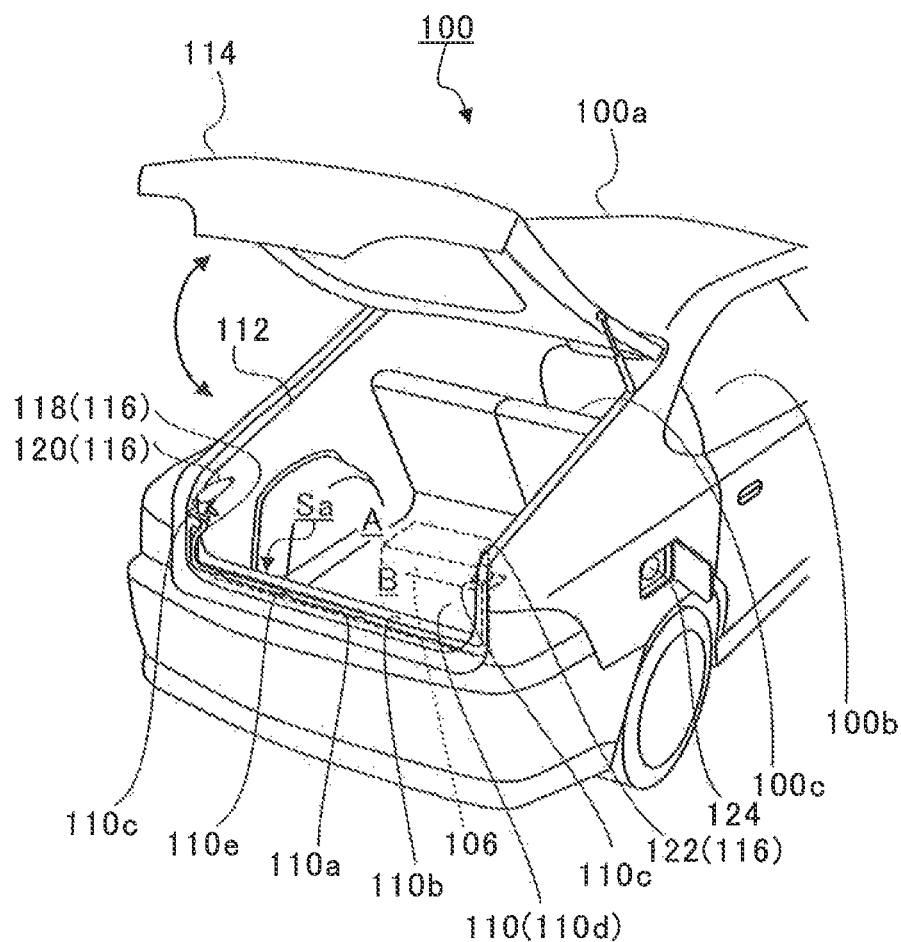
FIG. 2 is a perspective view of a rear side of the vehicle (a vehicle body)

FIG. 2 is a perspective view of the rear side of the vehicle 100 (the vehicle body 100a). As illustrated in FIG. 2, the vehicle 100 is a so-called hatchback vehicle and is provided with a luggage space 110 on a back surface side of a rear seat 100c in the vehicle cabin 100b. In one implementation, the luggage space 110 may serve as an "accommodating portion". An opening 112 that opens the luggage space 110 is provided from the top to the rear of the luggage space 110. A swing-up rear gate 114 rotates in directions indicated by both arrows in FIG. 2 by an unillustrated hinge mechanism and can thereby open/close the opening 112. In one implementation, the rear gate 114 may serve as an "opening/closing door" and a "rear hatch door".

The battery 106 is accommodated below the luggage space 110 and in the vicinity of the rear seat 100c. The power can be supplied to this battery 106 from a commercial household power supply via a charging unit 116, for instance. In one implementation, the commercial household power supply may serve as an "external power supply".

The charging unit 116 includes a charging cable 118, a charging gun 120 provided at one end of the charging cable 118, and a plug 122 provided at the other end of the charging cable 118. In the vehicle 100, a power receiver 124 is provided on an outer side of the luggage space 110, and the charging gun 120 can be coupled to the power receiver 124.

The power receiver 124 is coupled to the battery 106 via an unillustrated coupling cable. When the charging gun 120 is coupled to the power receiver 124 and the plug 122 is connected to a receptacle of the commercial power supply or the like, the battery 106 can be charged with the power from the commercial power supply.

When the charging unit 116 with these components is mounted on the vehicle 100, it is consider to bundle and dispose the charging cable 118, for instance. However, when the charging cable 118 is bundled and accommodated in the luggage space 110, the luggage space 110 is occupied by the charging cable 118 and is thereby reduced.

In addition, depending on disposition of the charging gun 120, when the vehicle 100 collides with an external object during an accident or the like, the charging gun 120 possibly collides with the battery 106 due to a shock. More specifically, in the cases where the charging gun 120 is disposed at a position A, at which the charging gun 120 opposes the battery 106 in a width direction of the vehicle body 100a, for instance, and the vehicle body 100a is involved in a side collision (a collision from the side), the charging gun 120 collides with the battery 106.

Meanwhile, in the cases where the charging gun 120 is disposed at a position B that is located at the rear of the battery 106 and the vehicle body 100a is involved in a rear collision, the charging gun 120 collides with the battery 106. In particular, in the case where the charging unit 116 in such a state where the charging cable 118 is bundled is accommodated at the rear of the battery 106, a frame and the like of the vehicle body 100a are plastically deformed. As a result, a space that is provided to absorb the shock of the rear collision is reduced.

Accordingly, in the vehicle body 100a, the luggage space 110 is provided with a charging unit accommodation portion Sa (a cable groove 110a, supports 110c, projections 110e, and side surfaces 110f) that accommodates the charging unit 116. The cable groove 110a is provided in an inner trim 110b of the luggage space 110. In one implementation, the inner trim 110b may serve as an "inner wall, surface". When the rear gate 114 is closed, the cable groove 110a is located on an inner side of the luggage space 110. For instance, the cable groove 110a herein extends along the opening 112 and also extends from the rear side to a part of a side surface side of the vehicle body 100a in the opening 112.

The luggage space 110 is provided with the supports 110c. The support 110c is provided above each end of the cable groove 110a. When the charging cable 118 is accommodated in the cable groove 110a, the charging gun 120 and the plug 122 are respectively locked by the supports 110c.

The supports 110c are each provided at a higher position than a bottom surface 110d of the luggage space 110. Accordingly, the charging gun 120 and the plug 122 that are respectively locked by the supports 110c are each disposed at a higher position than the battery 106 that is accommodated below the luggage space 110. That is, the charging gun 120 is disposed in a manner to avoid the position A, at which the charging gun 120 opposes the battery 106 in the width direction of the vehicle body 100a, and the position B that is located at the rear of the battery 106 (a vertical position of the battery 106 does not overlap a vertical position of the charging gun 120).

In other words, when the charging cable 118 is accommodated in the cable groove 110a, the charging gun 120 is disposed on an outer side of a transmission path, through which a shock load is transmitted to the battery 106 during the collision of the vehicle 100 with the external object. Thus, even when the side collision or the rear collision of the vehicle body 100a occurs, a situation where the charging gun 120 collides with the battery 106 can be avoided. Thus, the battery 106 can be protected from the charging gun 120.

For instance, when the charging cable 118 is bundled too tightly, a bent portion thereof is possibly worn. When the charging cable 118 is accommodated in the cable groove 110a, a shape of the charging cable 118 during accommodation is limited to a shape of the cable groove 110a. In the case where the cable groove 110a is designed in advance such that a curvature of the bent portion becomes at least equal to a specified value, such wear of the charging cable 118 is avoided. Thus, it is possible to improve durability of the charging cable 118 and suppress degradation of quality thereof. Therefore, required quality for the charging cable 118 can be secured for a long period.

Compared to a case where the charging cable 118 is simply bundled, the luggage space 110 is not occupied by the charging cable 118. Thus, an accommodating space for the luggage can widely be secured. In addition, because the charging cable 118 does not occupy a space at the rear of the battery 106, a space that is used to absorb the shock of the rear collision can sufficiently be secured.

The cable groove 110a is provided with the projections 110e to retain the charging cable 118.

Figure 3:
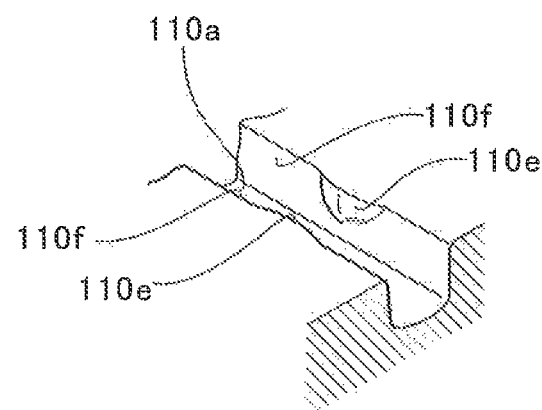
FIG. 3 is an explanatory view that explains a projection of a cable groove.

FIG. 3 is an explanatory view that explains the projections 110e of the cable groove 110a. In the drawing, a part of the cable groove 110a is extracted for illustration. As illustrated in FIG. 3, two side surfaces 110f of the cable groove 110a are respectively provided with the projections 110e that are projected in a direction to approach each other. A space between the opposing side surfaces 110f (the projections 110e) is narrower at a position where the projections 110e are provided than a position where the projections 110e are not provided. The space between the projections 110e is slightly smaller than an outer diameter of the charging cable 118.

When the charging cable 118 is accommodated in the cable groove 110a, the charging cable 118 is pushed deeper than these projections 110e to a bottom side of the cable groove 110a. As a result, the charging cable 118 that is accommodated, in the cable groove 110a is caught by the projections 110e and thus is less likely to be removed from the cable groove 110a.

Figure 4:
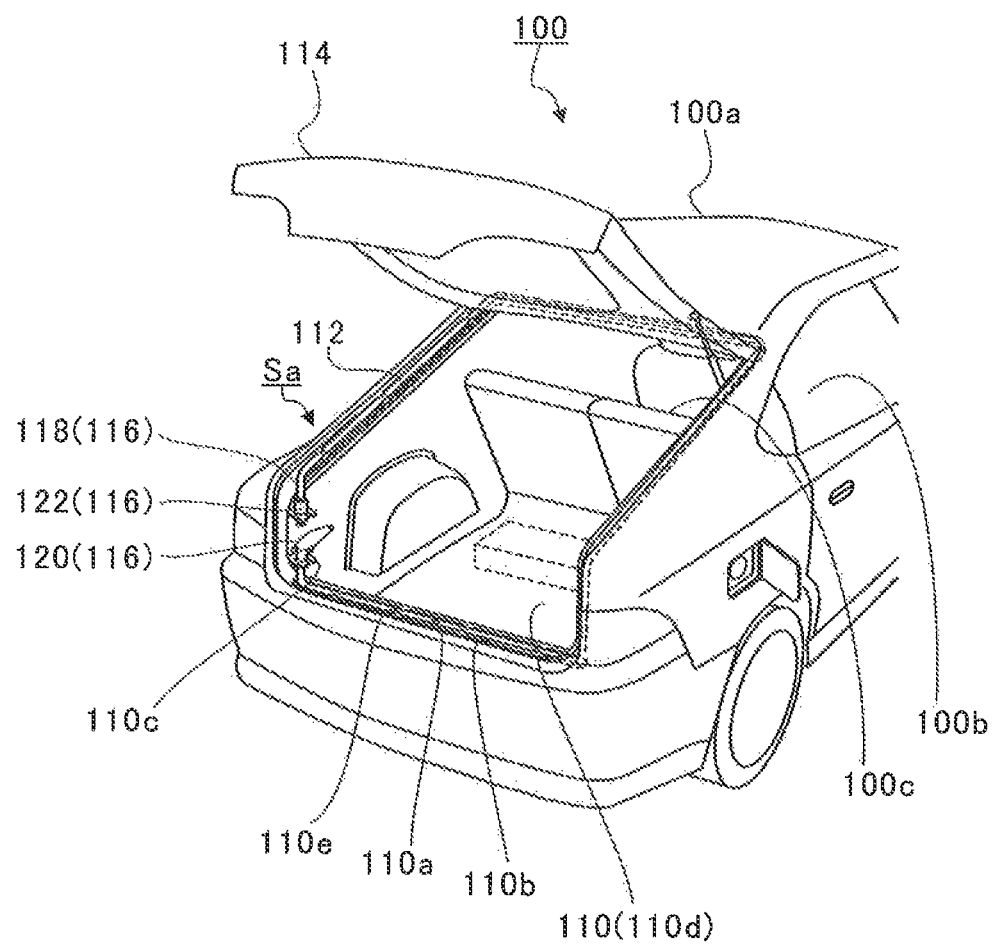
FIG. 4 is an explanatory view that explains a first modified example.

FIG. 4 is an explanatory view that explains a first modified example. As illustrated in FIG. 4, in the first modified example, the cable groove 110a extends longer than that in the above-described implementation. More specifically, the cable groove 110a extends in the inner trim 110b of the luggage space 110 along the opening 112 of the luggage space 110 and also extends around almost an entire periphery of the opening 112.

As described above, length of the cable groove 110a is not limited. For instance, the cable groove 110a may extend in the inner trim 110b of the luggage space 110 and may extend around the periphery of the opening 112 once or more. In addition, the cable groove 110a may be provided in a portion other than the inner trim 110b. The cable groove 110a may be provided in a sheet metal portion of the vehicle body 100a that is located on an outer side of the opening 112 of the luggage space 110.

In this case, both of the ends of the charging cable 118 are inserted on the inner side of the luggage space 110 through the opening 112, and the charging gun 120 and the plug 122 are disposed on the inner side of the luggage space 110. In this way, the charging gun 120 and the plug 122 are avoided from contacting rain and the like. As described above, a mechanism, that accommodates the charging unit 116 can be provided only by making a small design change.

Figure 5:
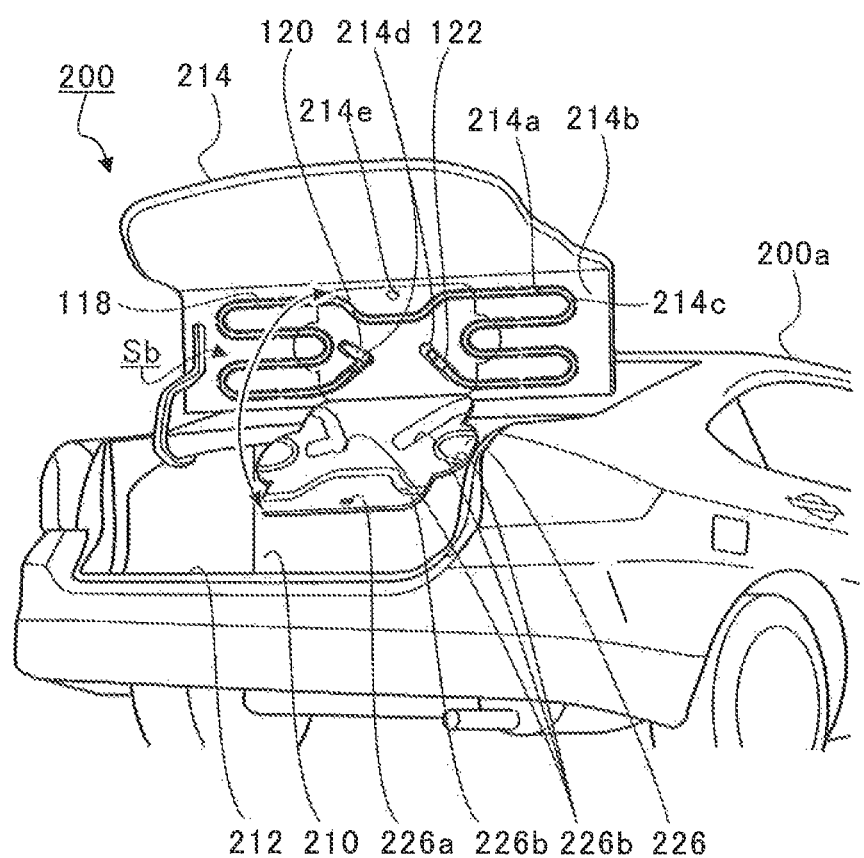
FIG. 5 is an explanatory view that explains a second modified example.

FIG. 5 is an explanatory view that explains a second modified example. As illustrated in FIG. 5, a vehicle 200 of the second modified example is a so-called sedan vehicle and is provided with a trunk room 210 in the rear of a vehicle body 200a. In one implementation, the trunk room 210 may serve as an "accommodating portion". An opening 212 of the trunk room 210 is opened/closed by a trunk lid 214. In one implementation, the trunk lid 214 may serve as an "opening/closing door".

A charging unit accommodation portion Sb (a cable groove 214a, projections 214c, large grooves 214d) is provided in an inner surface 214b on a trunk room 210 side of the trunk lid 214. Similar to the above-described implementation, the cable groove 214a is provided with the projections 214c. When the charging cable 118 is pushed into the cable groove 214a, the charging cable 118 that is accommodated in the cable groove 214a is caught by the projections 214c and thus is less likely to be removed from the cable groove 214a.

The cable groove 214a extends in a width direction of the vehicle body 200a. On a central side thereof, two large grooves 214d in which the charging gun 120 and the plug 122 are respectively accommodated are provided. In one implementation, the large groove 214d may serve as a "gun groove". The large groove 214d is continuously provided at each end of the cable groove 214a. The charging cable 118, the charging gun 120, and the plug 122 can continuously be accommodated in the cable groove 214a and the large grooves 214d.

One end of a support lid 226 is attached to the inner surface 214b of the trunk lid 214. The support lid 226 is rotatable in directions indicated by both arrows in FIG. 5 by an unillustrated hinge mechanism. When the other end side of the support lid 226 abuts (is closed) against the inner surface 214b of the trunk lid 214, a detachable portion 226a that is provided in the support lid 226 is fixed to a detachable portion 214e that is provided in the inner surface 214b of the trunk lid 214. Each of the detachable portions 214e, 226a is constructed of a thumbscrew, a belt to which a hook-and-loop fastener is attached, a magnet, or the like.

At this time, the support lid 226 at least partially covers the charging gun 120 and the plug 122, which are accommodated in the large grooves 214d, and retains the charging gun 120 and the plug 122 with the trunk lid 214. The charging gun 120 and the plug 122 are heavier than the charging cable 118 and thus are more likely to fall from the large grooves 214d. Thus, falling of the charging gun 120 and the plug 122 is prevented by being interposed between the support lid 226 and the trunk lid 214.

The support lid 226 may be provided to cover the entire charging cable 118. However, the support lid 226 covers the charging gun 120 and the plug 122 with a high possibility of falling while partially covers the charging cable 118. In this way, enlargement of the support lid 226 is suppressed. Thus, cost and weight thereof can be reduced.

The support lid 226 is provided with opposing grooves 226b at positions that oppose the charging cable 118, the charging gun 120, and the plug 122 at a time when the support lid 226 is closed. Even when being projected from the cable groove 214a or the large grooves 214d, the charging cable 118, the charging gun 120, or the plug 122 is fitted to the opposing groove 226b, and dislocation thereof is thereby suppressed. Thus, it is possible to improve the durability of the charging cable 118 and suppress the degradation of the quality thereof.

The description has been made so far on the preferred implementation of the present invention with reference to the accompanying drawings. However, it is needless to say that the present invention is not limited to the above-described implementation. It is also needless to say that various modification examples and correction examples that fall within the scope of the claims belong to the technical scope of the present invention.

For instance, in the implementation and the modified examples described above, the description has been made on a case where the charging gun 120 is provided at the end of the charging cable 118. Alternatively, the charging gun 120 may be provided at each of the ends of the charging cable 118.

In addition, in the implementation and the modified examples described above, the description has been made on a case where the charging unit accommodation portions Sa, Sb are provided in the accommodating portions (the luggage space 110 and the trunk room 210), each of which accommodates the luggage. Alternatively, each of the charging unit accommodation portions Sa, Sb may be provided at another position in the vehicle body 100a.

Furthermore, in the implementation and the modified examples described above, the description has been made on a case where the charging cable 118 is prevented from falling from the cable groove 110*a* by the projections 110*e* that are provided in the cable groove 110*a*. However, the projection 110*e* is not an essential configuration. As long as the charging cable 118 can be prevented from falling from the cable groove 110*a*, the belt, to which the hook-and-loop fastener is attached, or the like may be provided, for instance.

The invention claimed is:

1. A vehicle comprising: a vehicle accommodating portion that is provided in a vehicle body and has an opening; a battery that is provided below the accommodating portion; a power receiver that is configured to couple to a charging unit and configured to charge the battery with power from an external power supply, the charging unit having a charging cable and a charging gun provided at one end of the charging cable; and a charging unit accommodation portion configured to accommodate the charging unit, wherein the charging unit accommodation portion extends along the opening of the accommodating portion.

\* \* \* \* \*